United States Patent
Ruppert et al.

(10) Patent No.: US 10,874,490 B2
(45) Date of Patent: Dec. 29, 2020

(54) METHOD FOR PRODUCING A DENTAL PROSTHESIS WITH PARALLEL ROOTS OF THE PROSTHETIC TEETH

(71) Applicant: Kulzer GmbH, Hanau (DE)

(72) Inventors: Klaus Ruppert, Maintal (DE); Stephan Dekert, Obernhain (DE)

(73) Assignee: Kulzer GmbH, Hanau (DE)

( * ) Notice: Subject to any disclaimer, the term of this patent is extended or adjusted under 35 U.S.C. 154(b) by 0 days.

(21) Appl. No.: 16/604,212

(22) PCT Filed: Apr. 18, 2018

(86) PCT No.: PCT/EP2018/059888
§ 371 (c)(1),
(2) Date: Oct. 10, 2019

(87) PCT Pub. No.: WO2018/192966
PCT Pub. Date: Oct. 25, 2018

(65) Prior Publication Data
US 2020/0030063 A1 Jan. 30, 2020

(30) Foreign Application Priority Data
Apr. 21, 2017 (DE) .................. 10 2017 108 592

(51) Int. Cl.
*A61C 9/00* (2006.01)
*G06F 30/00* (2020.01)
(Continued)

(52) U.S. Cl.
CPC ........ *A61C 9/0046* (2013.01); *A61C 13/0004* (2013.01); *A61C 13/01* (2013.01);
(Continued)

(58) Field of Classification Search
CPC ............ A61C 13/0004; A61C 13/0006; A61C 13/0016; A61C 13/0022; A61C 13/004;
(Continued)

(56) References Cited

U.S. PATENT DOCUMENTS 8,454,362 B2 * 6/2013 Rubbert ............... A61C 8/0036
433/173
8,506,299 B2 8/2013 Gartner et al.
(Continued)

FOREIGN PATENT DOCUMENTS

DE 10304757 B4 7/2005
DE 102009056752 A1 6/2011
(Continued)

OTHER PUBLICATIONS

Office Action in DE Application No. 10 2017 108 592.0 dated Nov. 28, 2017, 5 pages.
(Continued)

*Primary Examiner* — Crystal J Barnes-Bullock
(74) *Attorney, Agent, or Firm* — Marshall, Gerstein & Borun LLP (57) ABSTRACT

A method for producing a dental prosthesis, the method including the following steps:
affixing several prefabricated prosthetic teeth in a support; producing a prosthetic base according to a virtual model with a CAM method to create tooth sockets that lie parallel to each other;
processing the prosthetic teeth basally and adjacent cervically while held in the support in accordance with the virtual model using a CAM method, so that the roots of the prosthetic teeth produced lie parallel to each other when the prosthetic teeth are inserted into the prosthetic base; and, inserting the processed prosthetic teeth together or in groups into the tooth sockets of the prosthetic base and attaching the processed prosthetic teeth in the tooth sockets.

(Continued)

Also provided are a dental prosthesis produced by the method and a device for implementing the method.

24 Claims, 6 Drawing Sheets

(51) Int. Cl.
    *A61C 13/01*        (2006.01)
    *A61C 13/08*        (2006.01)
    *A61C 13/10*        (2006.01)
    *A61C 13/00*        (2006.01)

(52) U.S. Cl.
    CPC .............. *A61C 13/08* (2013.01); *A61C 13/10* (2013.01); *G06F 30/00* (2020.01)

(58) Field of Classification Search
    CPC ......... A61C 13/01; A61C 13/08; A61C 13/10; A61C 13/1003; A61C 13/12; A61K 6/58; A61L 27/3865; A61L 2430/12; B29L 2301/7536; B29L 2031/7536; G06F 30/00
    See application file for complete search history.

(56) References Cited

U.S. PATENT DOCUMENTS

| | | | | |
|---|---|---|---|---|
| 8,602,780 B2* | 12/2013 | Rubbert | ................. | A61C 8/006 |
| | | | | 433/173 |
| 9,295,534 B2 | 3/2016 | Ruppert et al. | | |
| 9,820,833 B2* | 11/2017 | Noack | ................. | A61C 13/0022 |
| 9,907,630 B2* | 3/2018 | Beyer | ................. | A61C 13/0004 |
| 9,918,810 B2* | 3/2018 | Funk | .................. | A61C 13/0006 |
| 10,045,839 B2* | 8/2018 | Lin | ..................... | A61C 13/0018 |
| 10,292,794 B2* | 5/2019 | Heinz | ..................... | A61C 13/00 |
| 10,350,030 B2* | 7/2019 | Rubbert | .............. | A61L 27/3865 |
| 10,390,914 B2* | 8/2019 | Savic | ...................... | A61C 13/08 |
| 10,426,578 B2* | 10/2019 | Rubbert | ................ | A61C 19/063 |
| 10,463,456 B2* | 11/2019 | Ruppert | ................... | B33Y 10/00 |
| 2013/0158694 A1* | 6/2013 | Rubbert | ................... | A61C 5/30 |
| | | | | 700/98 |
| 2014/0087327 A1 | 3/2014 | Noack | | |
| 2015/0066181 A1 | 3/2015 | Beyer et al. | | |
| 2016/0193019 A1 | 7/2016 | Heinz et al. | | |
| 2017/0367798 A1 | 12/2017 | Sagolla et al. | | |
| 2018/0042709 A1* | 2/2018 | Savic | ................ | A61C 13/0022 |

FOREIGN PATENT DOCUMENTS

| | | |
|---|---|---|
| DE | 102014118231 B3 | 5/2016 |
| EP | 2666438 A2 | 11/2013 |
| EP | 2571451 B1 | 3/2014 |
| EP | 2742906 A1 | 6/2014 |
| WO | WO-91/07141 A1 | 5/1991 |
| WO | WO-2013/124452 A1 | 8/2013 |
| WO | WO-2016/091762 A1 | 6/2016 |
| WO | WO-2016/110392 A1 | 7/2016 |

OTHER PUBLICATIONS

Search Report and Written Opinion in International Application No. PCT/EP2018/059888 dated Jul. 27, 2018, 14 pages (translation of Search Report only).

* cited by examiner

METHOD FOR PRODUCING A DENTAL PROSTHESIS WITH PARALLEL ROOTS OF THE PROSTHETIC TEETH

BACKGROUND OF THE INVENTION

Field of the Invention

The invention relates to a method for producing a dental prosthesis, wherein the dental prosthesis has a prosthetic base and several prosthetic teeth, wherein the method is conducted using a virtual three-dimensional dental prosthesis model of the physical dental prosthesis to be produced.

Related Technology

The invention also relates to a dental prosthesis produced using such a method and a device or a combination of devices for implementing such a method.

The current standard method is the analog production of dental prostheses. In order to produce the prosthetic base, currently, an analog method is usually used in which initially, an imprint of the toothless jaw of the patient is taken. From this imprint, a plaster model of the patient's condition is created.

In order to produce the dental prosthesis, prosthetic teeth are manually and individually set down on a wax base on the plaster model of the toothless jaw. When setting down the prefabricated teeth, these are adapted to the respective oral condition of the patient by the dental technician and if necessary are also corrected by the dentist during the trial fitting.

In the next step, this wax prosthesis is embedded in a cuvette with plaster, silicone or gel (depending on the processing technique later used), in order to then remove the wax base from the form after the embedding material has hardened, so that a hollow space is created for the prosthesis plastic. The prosthetic teeth here usually remain in the embedding material. An appropriate plastic is injected or poured into the hollow space, creating the dental prosthesis after the plastic has hardened.

After the plastic has hardened, it is post-processed in order to obtain the desired surface quality.

As well as manual techniques, digital production methods are increasingly being used in the dentistry field. Tooth replacements such as crowns and bridges, have been produced for several years with CAD/CAM technologies, using subtractive methods involving milling (CAM—Computer-Aided Manufacturing, CAD—Computer-Aided Design).

A CAD/CAM method for producing a dental prosthesis is known from WO 91/07141 A1, wherein with this method, a prosthetic base is milled on the basis of an imprint from a plastic block.

Further, generative CAM methods such as SLM (Selective Laser Melting) are increasingly being used to produce crowns, bridges and models, as is DLP (Digital Light Processing) for polymer-based dental products, such as temporary appliances, prostheses, ortho equipment (orthodontic equipment), occlusal splints, drill templates or dental models. Here, the production of tooth replacements on an acrylate base using RP (Rapid Prototyping) methods has to date been subject to an increasing number of restrictions. To date, it has only been possible to produce multi-color tooth replacements, or tooth replacements from different polymer materials (such as for enamel and dentine masses) for producing high-quality, aesthetically pleasing tooth replacements using expensive RP machines with several material chambers or using adhesion and joining techniques.

Equally, the production of material combinations (such as alloys and polymers) using RP methods has to date been very expensive and has not been used for serial production. The generative production of aesthetically pleasing, prefabricated teeth for partial or total prostheses is currently not possible, since only one material or one color can be printed using stereolithography. Currently, it is not possible to print multi-color prefabricated teeth. For this reason, the prosthetic base is produced using CAM methods (such as milling or printing) and prefabricated prosthetic teeth are adhered to the prosthetic base. Here, the prosthetic base can be produced using both generative methods (SLA, DLP, FDM, etc.) and subtractive methods (milling, and similar). The artificial prosthetic teeth can be produced both as individual teeth and as complete rows of teeth and adhered to the prosthesis.

First methods already exist, such as the methods known from DE 10 2009 056 752 A1 or WO 2013 124 452 A1 in which a partial or entire dental prosthesis is designed digitally and produced using CAD/CAM methods. EP 2 742 906 A1 discloses a method in which a dental arch is connected to impression material, wherein the impression material is contained in an individualized impression tray and contains an imprint of the oral cavity condition of the patient. The surface of the form with the dental arch is digitalized and then in the computer, a virtual model of the dental arch is positioned and oriented with the best possible fit in the virtual model of the prosthetic base. During the subsequent production, the prosthetic teeth must be individually and manually checked for correct fitting into the tooth sockets provided in the prosthetic base, in order to then glue them in, wherein a transfer template can be used as a control instrument. WO 2016/091762 A1 discloses a method for producing a dental prosthesis in which a template is generated with which several prosthetic teeth can be attached in the desired location and orientation in relation to each other on a prosthetic base. DE 103 04 757 B4 also discloses a method for producing tooth replacements in which a virtual set-up of the teeth is conducted in a virtual model, and the prosthetic base is produced on the basis of the virtual model. WO 2016/110 392 A1 discloses a method for producing a dental prosthesis in which a plastically deformable connecting means is inserted into tooth sockets of a prosthetic base in order to enable a manual correction of the alignment of the prosthetic teeth in the prosthetic base.

When producing a removable tooth replacement, such as full or partial prostheses that have been produced with the aid of digital data with a CAD construction, there are technical solution methods of separating the data of the prosthetic base and the teeth. The prosthetic base can here be produced using an additive or subtractive production method. Possible prosthetic teeth are prefabricated plastic teeth or individually produced prosthetic teeth or dental arches from the same initial materials. In all cases, tooth sockets must be provided on the prosthetic base to hold these prosthetic teeth, into which the prosthetic teeth or dental arches are attached, for example using adhesion, in a subsequent manual production step.

Such methods have the disadvantage that prefabricated prosthetic teeth in particular often have to be occlusally and/or basally post-processed, wherein the tooth sockets of the prosthetic base also then have to be ground in order to adapt the position and location of the prosthetic teeth in the dental prosthesis. In most cases, with prefabricated prosthetic teeth, which deliver the best aesthetic results, these must at least be basally shortened prior to adhesion in order to set the bite level (the occlusion) of the dental prosthesis, making it necessary to provide a rational, low-cost method for this purpose.

For this purpose, methods are known from EP 2 571 451 B1 and EP 2 666 438 A2 in which prefabricated prosthetic teeth are embedded in a holder in wax and then basally milled off using CAM methods. The prosthetic teeth thus shortened are freed from the wax and then inserted into a prosthetic base and glued there in order to produce a dental prosthesis.

These methods have the disadvantage that the prosthetic teeth are processed individually or in groups and must be inserted and glued into the prosthetic base individually. The correct place for inserting the prosthetic teeth into the prosthetic base must here be found through trial and error. The suitable basal form of the prosthetic teeth must be computed for each prosthetic tooth. In addition, the locations and orientations of the individual prosthetic teeth in the wax block must be determined, so that they can be basally reduced using a fully automated, computer-controlled CAM milling method. Such methods may lead to erroneous placement of prosthetic teeth in the prosthetic base, or these erroneous placements must be prevented using additional measures. When using industrially produced (and therefore prefabricated) individual prosthetic teeth, these must usually be basally shortened prior to adhesion in order to adjust the bite level or in order to achieve an optimal occlusion with the dental prosthesis to be produced.

When producing high-quality and highly aesthetic dental prostheses using such prefabricated prosthetic teeth and a prosthetic base produced using CAD/CAM methods, the prosthetic teeth and the prosthetic base must be permanently connected with each other at low cost. The connection of the prosthetic teeth with the prosthetic base should therefore be as easy as possible, with as little cost as possible and involving only a small number of steps. Since the tooth sockets of the prosthetic base cannot usually be very deep, the inserted prosthetic teeth do not have sufficient guidance, so that a rotation or tipping movement in the oral or lingual direction of each individual prosthetic tooth, as well as of the prosthetic teeth in relation to each other, is possible with regard to the spaces between the teeth. A free-hand positioning of the prosthetic teeth therefore dilutes the advantages of an optimal CAD-constructed set-up and coordination of the prosthetic teeth in the prosthetic bases for the upper and lower jaw.

SUMMARY

The object of the invention is therefore to overcome the disadvantages of the prior art. In particular, a method should be provided with which a simple production of the dental prosthesis is possible that is not prone to error and that can be quickly completed, and a device is to be provided with which the essential method steps can be implemented. Here, it should be possible to use modern, computer-controlled methods and to make available data and techniques as widely usable as possible. In addition, it should be possible to attach the prosthetic teeth as far as possible without incorrect placement in the previously computed orientation and location on the prosthetic base. The completed dental prosthesis should as far as possible be ready for use without further manual post-processing, or with as little manual post-processing as possible. The location and alignment of the prosthetic teeth in the tooth sockets of the prosthetic base should be enabled in the easiest, most accurate way possible.

The objects of the invention are attained by means of a method for producing a dental prosthesis, wherein the dental prosthesis has a prosthetic base and several prosthetic teeth, wherein the method is conducted using a virtual three-dimensional dental prosthesis model of the physical dental prosthesis to be produced, and wherein the virtual three-dimensional dental prosthesis model is divided into at least one virtual three-dimensional model of the prosthetic teeth and one virtual three-dimensional model of the prosthetic base, or comprises at least one virtual three-dimensional model of the prosthetic teeth and one virtual three-dimensional model of the prosthetic base, wherein the boundary are between the virtual model of the prosthetic teeth and the virtual model of the prosthetic base is computed such that the prosthetic teeth in the virtual model has roots that are aligned parallel to each other and the prosthetic base in the virtual model has tooth sockets that are aligned parallel, wherein the tooth sockets form a negative shape of the roots of the prosthetic teeth, having the following steps:

A) Affixing several prefabricated prosthetic teeth for the production of the dental prosthesis in a supporting means or Providing several prefabricated prosthetic teeth for the production of the dental prosthesis being affixed in a supporting means;

B) Producing the prosthetic base according to the virtual model of the prosthetic base with a CAM method, wherein in the prosthetic base, tooth sockets are created that lie parallel to each other;

C) Processing the prosthetic teeth basally and adjacent cervically while held in the supporting means in accordance with the virtual model of the prosthetic teeth using a CAM method, so that the roots of the prosthetic teeth produced lie parallel to each other when the prosthetic teeth are inserted into the prosthetic base;

D) Inserting the processed prosthetic teeth together or in groups into the tooth sockets of the prosthetic base and attaching the processed prosthetic teeth in the tooth sockets.

In particular, Rapid Prototyping methods are preferred as CAM methods. Preferably, the prosthetic teeth are subtractively processed on the basal side. Here, in a particularly preferred manner, a computer-controlled CAM milling machine, such as a computer-controlled 4-axis or 5-axis milling machine, is used.

The tooth sockets and the roots of the prosthetic teeth can have a cylindrical form or the form of a cone or cone stump. A parallel alignment of the tooth sockets (or the roots of the prosthetic teeth) then corresponds to a parallel alignment of the cylinder axes and/or cone axes. However, it is also possible for the forms of the tooth sockets and of the roots to deviate from these forms. The forms of the tooth sockets and equivalent to these, the form of the roots of the prosthetic teeth, can then however be approximated in a good approximation by one cylinder, one cone or one cone stump respectively, for example computationally. Then, parallel aligned tooth sockets should then be understood as a parallel alignment of the cylinder axes of the approximated cylinders and/or the cone axes of the approximated cones and/or cone stumps, which in a good approximation correspond to the form of the actual tooth sockets. The same applies to the roots of the prosthetic teeth.

Preferably, the prosthetic teeth are attached by gluing them into the tooth sockets of the prosthetic base.

The term "occlusal" means on the occlusion area or chewing area, and "towards the occlusion area" is a designation of the location and direction on the teeth. The term "cervical" means on the tooth neck, towards the tooth neck. These terms are also used for prosthetic teeth.

A root of a prosthetic tooth is the area of the prosthetic tooth that is located below the crown and which extends in the direction away from the occlusion area, which is used, or can be used, for connection with the prosthetic base. Here, it is assumed that the occlusion area of the prosthetic tooth defines its upper (coronal) end. Naturally, the roots of the prosthetic tooth do not serve to anchor the prosthetic tooth in the alveolae of the jawbone, but precisely in the tooth sockets of the prosthetic base.

With the method according to the invention, it can be provided that the prefabricated prosthetic teeth in step A) are affixed to each other in a supporting means in a position and location in which the coronal sides of the prosthetic teeth correspond to the location and alignment of the prosthetic teeth in relation to each other in the virtual dental prosthesis model.

As a result, the prosthetic teeth can immediately be held in the desired end position, so that the processing of the prosthetic teeth and the subsequent method is simplified. This therefore enables joint processing of all prosthetic teeth during the method, including when the prosthetic teeth are inserted and attached in the tooth sockets.

Here, it can be provided that in step C), the prefabricated prosthetic teeth are attached for processing in the supporting means in a CAM device, in particular in a computer-controlled mill as a CAM device.

As a result, the supporting means for fixing and supporting the prosthetic teeth in the CM device can be used for processing the basal sides of the prosthetic teeth.

According to a preferred embodiment of the method according to the invention, it can be provided that the basal ends of the prosthetic teeth lie exposed when they are affixed in the supporting means. As a result, the prosthetic teeth can be more easily basally and cervically processed on the basal side.

Further, it can be provided that in step D), the prosthetic teeth affixed and processed in the supporting means are inserted into the prosthetic base and in step D) or at a time after step D), the supporting means is removed after the processed prosthetic teeth have been inserted into the prosthetic base.

As a result, the supporting means can also be used to position the prosthetic teeth in the prosthetic base. Thus, the method is further simplified and the number of work steps required is reduced. By means of this step, it should also be clarified that the supporting means are not permanently connected with the prosthetic teeth. By contrast, the prosthetic teeth or prosthetic tooth should finally be permanently connected to the prosthetic base in order to produce the dental prosthesis.

With a further development of the method according to the invention, it is recommended that the virtual three-dimensional dental prosthesis model is separated computationally by means of file-splitting into the at least one virtual three-dimensional model of the prosthetic teeth and the virtual three-dimensional model of the prosthetic base.

As a result, at first, the virtual dental prosthesis model can be produced, and then a suitable boundary area can be generated between the at least one virtual three-dimensional model of the prosthetic teeth and the virtual three-dimensional model of the prosthetic base with the parallel tooth sockets in the prosthetic base and the parallel roots of the prosthetic teeth.

Here, it can preferably be provided that when the virtual dental prosthesis model is divided, the tooth sockets are computed into the virtual model of the prosthetic base and the roots into the at least one virtual model of the prosthetic teeth, so that the form of the virtual model of the prosthetic base can be connected or placed adjacent flush with the form of the basal sides of the at least one virtual model of the prosthetic teeth.

As a result, the form of the prosthetic base generated with the aid of the virtual models and the processed prosthetic teeth can be precisely adjusted to each other and can be attached to each other flush and therefore in a stable manner, or that the physical prosthetic teeth that have been produced or processed in accordance with the at least one virtual model of the prosthetic teeth can be placed in or inserted flush, and all can be placed in or inserted from the same direction into the tooth sockets of the physical prosthetic base. For attachment purposes, naturally, a gap size or adhesive gap can be provided that is directly computed into the boundary area. The gap size or adhesive gap can then be filled with a cement or an adhesive to bond the prosthetic teeth with the prosthetic base when constructing the physical dental prosthesis.

Further, it can be provided that when computing the boundary area between the at least one virtual model of the prosthetic teeth and the virtual model of the prosthetic base, the surfaces of the computed roots of the virtual models of the prosthetic teeth are disposed within the virtual surface of the unprocessed prefabricated prosthetic teeth or the entire boundary area is disposed within the virtual surface of the unprocessed prefabricated prosthetic teeth.

As a result, it is ensured that the prefabricated prosthetic teeth can be brought into the previously computed form of the virtual model of the prosthetic teeth using a subtractive processing method.

Preferably, it can further be provided that from the external form of occlusal surfaces of the prosthetic teeth or from the external form of cervical surfaces of the coronal side of the prosthetic teeth and occlusal surfaces of the prosthetic teeth of the virtual three-dimensional dental prosthesis model, a virtual model of the supporting means is computed, so that an area of the virtual surface of the virtual supporting means is formed by a negative of the occlusal surfaces or of the occlusal and cervical surfaces of the prosthetic teeth, wherein the location and orientation of the prosthetic teeth relative to each other remains the same in the negative, wherein the physical supporting means is produced with a CAM method on the basis of the data of the virtual model of the supporting means and the physical prosthetic teeth are placed onto and attached to the supporting means, wherein the occlusal surfaces or the occlusal and cervical surfaces of the prosthetic teeth are placed onto the surface of the supporting means that is formed as a matching negative.

As a result, with the data already available, a supporting means is computed and produced with which the method can be quickly implemented and with the fewest possible work steps.

Preferably, it can be provided that the supporting means is produced and/or processed with a CAM method, in particular with a Radio Prototyping method, based on the virtual model of the supporting means.

It can also be provided that the virtual three-dimensional dental prosthesis model is produced on the basis of an intraoral scan or of a scan of an imprint of the oral cavity condition of the patient in order to shape the virtual prosthetic base and by means of a virtual positioning of virtual models of the prefabricated prosthetic teeth in the virtual prosthetic base, wherein preferably, the form, location and/or orientation of the prosthetic teeth is selected by means of a simulation of the location of the dental prosthesis in the oral cavity of the patient and/or by means of a simulation of the location and orientation of the prosthetic teeth in relation to each other and/or in relation to the prosthetic base, wherein in a particularly preferred manner, the occlusion plane and/or the chewing movements of the jaw are simulated.

As a result, a high-quality dental prosthesis is created that only needs to be post-processed to as low a degree as possible. At the same time, the dental prosthesis thus produced enables a good chewing function for the patient.

Preferred methods can also be particularly characterized in that in step C), the prosthetic teeth are basally ablated and on the basal side cervically ablated, based on the virtual model of the prosthetic teeth using the CAM method, preferably milled off with a computer-controlled milling machine.

As a result, no construction on the basal area of the prosthetic teeth is required, as a result of which the stability of the prosthetic teeth is retained and thus the stability of the dental prosthesis is optimized. The prosthetic base can be generatively produced, i.e. for example, it can be produced with a 3D printer.

Further, it can be provided that the prosthetic teeth are cervically reduced basally and on the basal side, based on the virtual model of the prosthetic teeth, with the CAM method, preferably milled off such that the form of the roots of the prosthetic teeth produced is adapted such to the tooth sockets for the prosthetic teeth in the prosthetic base that the outer for of the prosthetic base with the inserted prosthetic teeth corresponds to the outer form of the virtual dental prosthesis model.

Alternatively, it can be provided that the prefabricated prosthetic teeth are produced with a CAM method, preferably by milling or a constructive CAM method.

With a further development of the method according to the invention, it can be provided that in order to compute the virtual dental prosthesis model, data already available on the outer form of known prefabricated prosthetic teeth can be used.

As a result, the outer forms of the prefabricated prosthetic teeth do not have to be recorded or scanned in.

Further, it can be provided that the prosthetic teeth are processed in step C) such that the roots have a symmetry axis that corresponds to the insertion direction into the tooth sockets of the prosthetic base, or at least largely corresponds to the insertion direction into the tooth sockets of the prosthetic base.

As a result, the processed prosthetic teeth can simply be inserted into the tooth sockets of the prosthetic base, since the roots of the processed prosthetic teeth easily slide into the tooth sockets, in parallel with each other. In this context, "largely" means that the deviation of the axes is maximum 2°.

Here, it can in turn be provided that with at least one of the processed prosthetic teeth, the symmetry axis of the roots is inclined against the axis of the coronal sides of the prosthetic teeth, preferably incline by at least 0.5°, particularly preferably inclined by at least 2°.

The axis of the coronal sides of the prosthetic teeth is preferably the axis that runs vertically to the occlusion plane of the prosthetic tooth and through its focal point.

As a result, it is made clear that the prosthetic teeth on the basis side must and can be produced without taking into account the location of the axis on the coronal side of the prosthetic teeth. Thus, the connection between the processed prosthetic teeth and the prosthetic base is simplified independently of the location of the axes of the coronal sides of the prosthetic teeth in relation to each other.

According to the invention, it can also be provided that the supporting means are a silicone key, a matrix, a wax or an occlusion plate.

When a wax is used as a supporting means, the wax is removed prior to the final connection of the process prosthetic teeth with the prosthetic base by melting out and cleaning the prosthetic teeth, wherein preferably, the prosthetic teeth are cleaned with hot water or water vapor.

Such supporting means are well suited for supporting the prosthetic teeth during processing and during connection of the prosthetic teeth with the prosthetic base.

Further, it can be provided that the prosthetic teeth are connected with the prosthetic base at the same time and together in a single work step.

Thus, it is achieved that the number of necessary work steps is reduced to a minimum.

The objects that form the basis of the present invention are also attained by a dental prosthesis produced with a method according to the invention, wherein several prosthetic teeth or all prosthetic teeth of the dental prosthesis have roots that are aligned parallel to each other, which are attached, in particular glued, into matching tooth sockets of the prosthetic base that are aligned parallel to each other.

Here, it can be provided that the prefabricated prosthetic teeth connected to the prosthetic base on the occlusion area, preferably on the entire coronal side, are not post-processed, or are only subject to minor manual post-processing.

The dental prostheses produced with the advantageous method according to the invention make it possible that the coronal sides or at least the occlusion areas of the prosthetic teeth do not necessarily have to be processed and thus not using a CAM method. This offers the advantage that the structure, in particular the low degree of roughness, of these surfaces remains intact, so that the dental prosthesis is less quickly contaminated with coatings during use and is easier to clean. In addition, the dental prosthesis can thus be produced faster and at lower cost.

The objects that form the basis of the present invention are further attained by means of a device or combination of devices for conducting a method, comprising at least one CAM device and a computer for computing the virtual models and for controlling a first CAM device for processing the basal sides of the prosthetic teeth and for controlling the first CAM device or a second CAM device for producing the prosthetic base.

The device or combination of devices here requires no installation with which the supporting means is produced when the supporting means is manually poured. However, preferably, it can be provided that the device or combination of devices has a module for computing a virtual three-dimensional model of the supporting means.

With devices or combinations of devices according to the invention, it can preferably also be provided that the device or combination of devices comprises at least one of the following modules:

a dental prosthesis computing module for computing a virtual three-dimensional model of the dental prosthesis from the data of the oral cavity condition of a patient, a root computing module for computing a boundary area between a virtual three-dimensional model of the prosthetic base and at least one virtual three-dimensional model of the prosthetic teeth, wherein the root computing module is programmed such that for each virtual three-dimensional form of each prosthetic tooth of the at least one model of the prosthetic teeth, a basal root is computed as part of the boundary area, wherein the basal roots are aligned parallel to each other, and a file-splitting module for the computational separation of a virtual three-dimensional dental prosthesis model into a virtual three-dimensional model of the prosthetic base and at least one virtual three-dimensional model of the prosthetic teeth.

Here, the dental prosthesis computing module is preferably designed to compute a virtual three-dimensional mode of a dental prosthesis from the data of the oral cavity condition of a patient and from the three-dimensional form data of different sets of prefabricated prosthetic teeth.

The invention is based on the surprising finding that by means of a parallel alignment of roots and several prosthetic teeth and matching parallel aligned tooth sockets, a simultaneous insertion and attachment of the prosthetic teeth into the prosthetic base can be conducted, wherein the insertion can be completed in a single work step. Additionally, this also makes it possible to arrange the prosthetic teeth in the desired location and orientation in relation to each other and also to render impossible a mix-up of the prosthetic teeth and a twisting or tipping of the prosthetic teeth against each other. Through the insertion of the prosthetic teeth in a single step, work time is saved and the method can be implemented more quickly.

BRIEF DESCRIPTION OF THE DRAWINGS

In the following, exemplary embodiments of the invention are explained with reference to five schematically depicted figures, although without limiting the invention thereto, in which.

DETAILED DESCRIPTION

Figure 1:
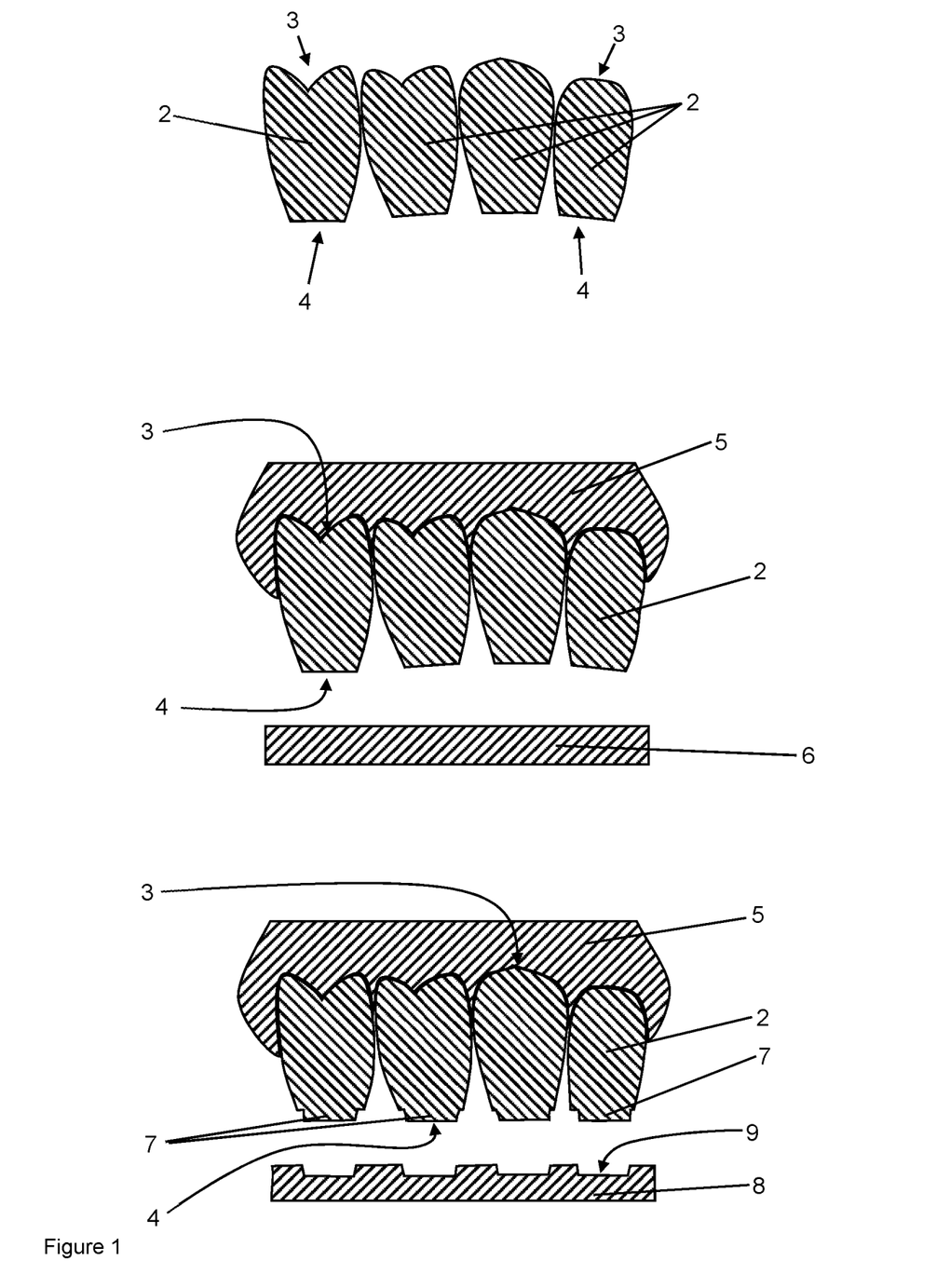
FIG. 1 and FIG. 2: show a progress of an exemplary method according to the invention as a total of five schematic profile views arranged one above the other.
Figure 2:
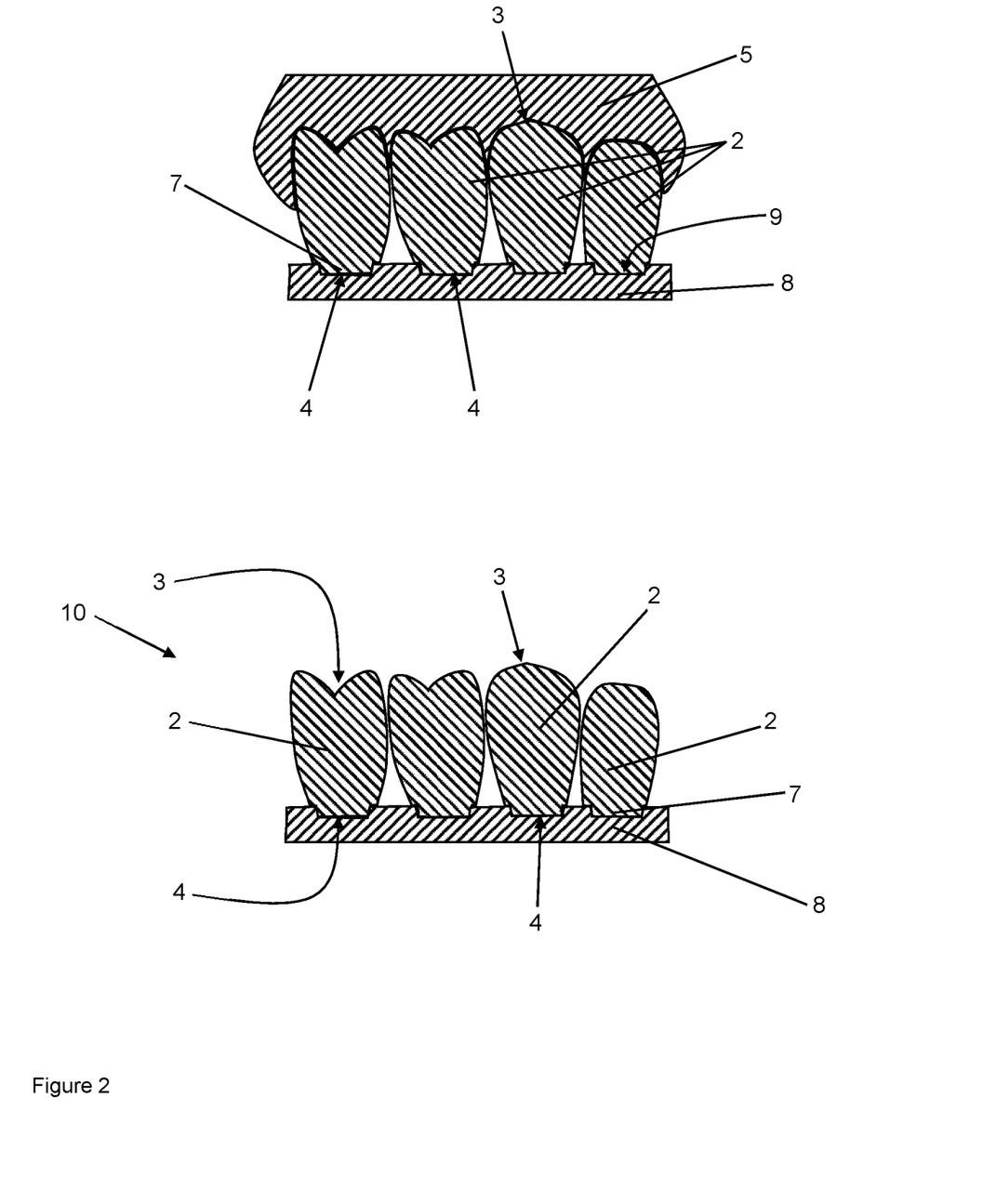

FIGS. 1 and 2 show a progress of an exemplary method according to the invention in five steps as a total of five schematic profile views arranged one above the other.

In FIG. 1, the first three method steps are shown. At the start of the method (FIG. 1, top drawing), several prefabricated prosthetic teeth 2 are provided. The prosthetic teeth 2 have been selected on the basis of a computational method. First, a virtual three-dimensional dental prosthesis model is produced with a CAD method on the basis of a model of the oral cavity condition of a patient (not shown in FIGS. 1 and 2). Here, the form of the mucosa determines the form of the contact surface of the dental prosthesis and matching prosthetic teeth 2 are selected from the known three-dimensional forms of a plurality of previously registered prefabricated prosthetic teeth. As a result, the selected prosthetic teeth 2 determine the virtual form of the prosthetic teeth 2 in the virtual dental prosthesis model.

Each prosthetic tooth 2 has a coronal side 3 and a basal side 4. The coronal sides 3 later form the occlusion areas of the dental prosthesis. The virtual three-dimensional models of the prosthetic teeth 2 are arranged in the virtual three-dimensional dental prosthesis model such that a dental prosthesis that matches the oral cavity condition is computed with a matching occlusion of the prosthetic teeth 2. Then, using file splitting, the virtual three-dimensional dental prosthesis model in the computer into a virtual three-dimensional model of the prosthetic base 8 and into virtual three-dimensional models of the prosthetic teeth 2. Here, the boundary areas between the model of the prosthetic base 8 and the models of the prosthetic teeth 2 are computed in the model of the prosthetic base 8 with roots 7 for the prosthetic teeth 2 and with tooth sockets 9 that match them. When forming the boundary areas, the roots 7 of the models of the prosthetic teeth 2 and the tooth sockets 9 of the model of the prosthetic base 8 are aligned parallel to each other.

In a next step (FIG. 1, middle drawing), the prosthetic teeth 2 are affixed with their coronal sides 3 in a supporting means 5. The supporting means 5 can for example be a silicone key which is poured onto the prosthetic teeth 2. Preferably, the supporting means 5 is computed in the virtual dental prosthesis model from a negative of the coronal sides of the prosthetic teeth 2 as an occlusion plate with the aid of a CAD/CAM method. This ensures that the prosthetic teeth 2 are affixed in the supporting means 5 in the position and orientation in relation to each other in which they are also arranged in the final dental prosthesis 10 (see FIG. 2, lower drawing). In all cases, the prosthetic teeth 2 should be affixed as far as possible in the supporting means 5 in precisely this position and orientation in relation to each other. Additionally, in the middle drawing of FIG. 1, a prosthetic base blank 6 made of a suitably colored plastic is shown below, which is provided for the further method steps.

In the next step (FIG. 1 below), the prosthetic teeth 2 on the basal side 4 are basally and cervically ground down with the aid of a computer-controlled 4-axis milling machine based on the virtual three-dimensional models of the prosthetic teeth obtained by the file splitting. As a result, on the basal sides 4, the previously computed roots 7 are produced that are aligned parallel to each other.

Additionally, the prosthetic base blank 6 is also ground down with a computer-controlled 4-axis milling machine based on the virtual three-dimensional model of the prosthetic base 8 obtained by file splitting, and thus, the physical prosthetic base 8 is produced. In the prosthetic base 8, the tooth sockets 9 are accordingly produced that match the roots 7. The tooth sockets 9 are therefore also aligned parallel to each other.

Due to the parallel alignment of the roots 7 and the tooth sockets 9 and due to the prosthetic teeth 2 that are positioned and oriented in the virtual three-dimensional dental prosthesis model, the prosthetic teeth 2 in the supporting means 5 can be simply inserted into the tooth sockets 9 of the prosthetic base 8. This situation is shown in FIG. 2 above. The roots 7 and the tooth sockets 9 have a conical or at least tapering form in order to simplify the connection of the prosthetic teeth 2 with the prosthetic base 8. The prosthetic teeth 2 are glued into the tooth sockets 9 with a PMMA cement or an adhesive. For this purpose, the cement or the adhesive is previously filled up to the required level or flowing over into the tooth sockets 9.

For cementing purposes, a cement or adhesive can be used in excess, so that potential intermediate spaces between the tooth sockets 9 can be filled in order to affix the prosthetic teeth 2 in the prosthetic base 8 and the prosthetic teeth 2 with the cement or adhesive, without basal hollow spaces remaining in the intermediate spaces and without edge gaps remaining in the gingiva-tooth neck area of the dental prosthesis produced. Additionally, the contact areas are optionally moistened due to the excess amount. Excess cement paste residues or adhesive residues that bulge out can be removed before hardening and/or after hardening. For the final attachment of the prosthetic teeth 2 in the prosthetic base 8, a self-hardening cement on a powder-liquid basis is preferably used. The adhesive or cement can also or additionally be applied to the roots 7 of the prosthetic teeth 2.

After the PMMA cement or adhesive has hardened, the prosthetic teeth 2 are finally connected with the prosthetic base 8. Then, the supporting means 5 can be removed. The dental prosthesis 10 thus produced is shown below in FIG. 2.

Figure 3:
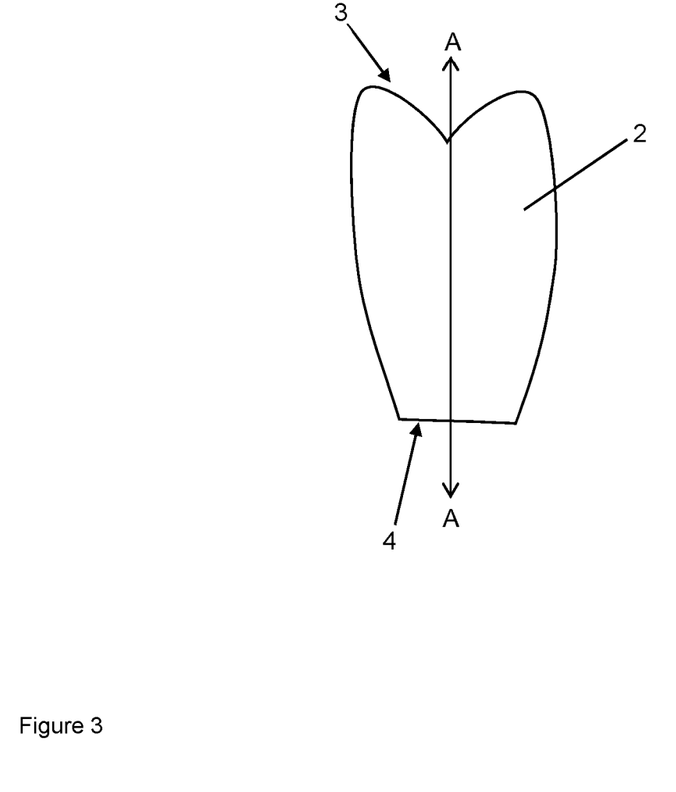
FIG. 3: shows a schematic profile view of an unprocessed, prefabricated prosthetic tooth.
Figure 4:
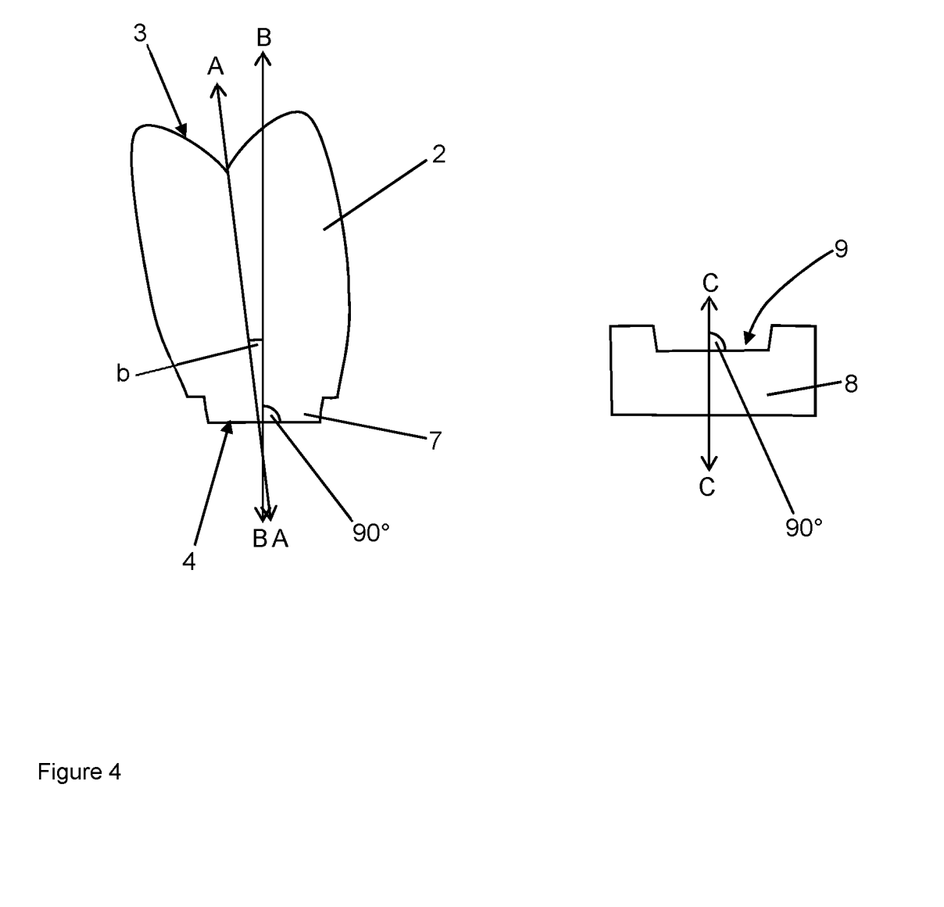
FIG. 4: shows a schematic profile view of the prosthetic tooth according to FIG. 3 following basal processing and a prosthetic base with a matching tooth socket.

By means of schematic lateral profile views, it is shown in FIGS. 3 and 4 that with a method according to the invention, the orientation of the alignment of the coronal side 3 of the prosthetic teeth 2 does not have to conform to the orientation of the alignment of the roots 7. Instead, the method is even preferably implemented such that the alignment of the coronal side 3 of the prosthetic teeth 2 does not conform to the orientation of the alignment of the roots 7. Thus, the prosthetic teeth 2 can be more precisely and more fittingly constructed for the occlusion of the dental prosthesis. The unprocessed prosthetic tooth 2 (see FIG. 3) has a symmetry axis A which is determined by the form of the prosthetic tooth 2, in particular the coronal side 3 of the prosthetic tooth 2. When processing the prosthetic tooth 2, a root 7 is milled or ground into the basal side 4 of the prosthetic tooth 2. The root 7 has a conical form with a symmetry axis B. The symmetry axis B of the root 7 is here in FIG. 4 aligned vertically to a planar basal area of the root 7. The root 7 often has no planar lower side, however, but is preferably adapted to the form of the prosthetic base 8. The root 7 is in reality at least approximately cylinder-shaped or cone stump-shaped. The symmetry axis B is defined by the location of the symmetry axis of this approximated cylinder or cone. With the processed prosthetic tooth 2, the alignment of the symmetry axis A is determined only be the coronal side 3 of the prosthetic tooth 2.

As can be seen in FIG. 4, the symmetry axes A and B do not correspond, but are tilted in relation to each other at an angle b of 7°.

In line with this, a tooth socket 9 is provided in the prosthetic base 8 with a conical or tapering form, which matches the root 7 of the prosthetic tooth 2. Accordingly, the tooth socket 9 has matching symmetry with a matching symmetry axis C. The symmetry axis C of the tooth socket 9 and the symmetry axis B of the root 7 correspond to each other when the prosthetic tooth 2 is inserted into the prosthetic base 8. Due to these matching forms of the roots 7 and the tooth sockets 9, and due to the parallel alignment of the roots 7 and the tooth sockets 9, the prosthetic teeth 2 can easily be inserted into the prosthetic base 8 parallel to each other and therefore simultaneously and in a single work step.

Figure 6:
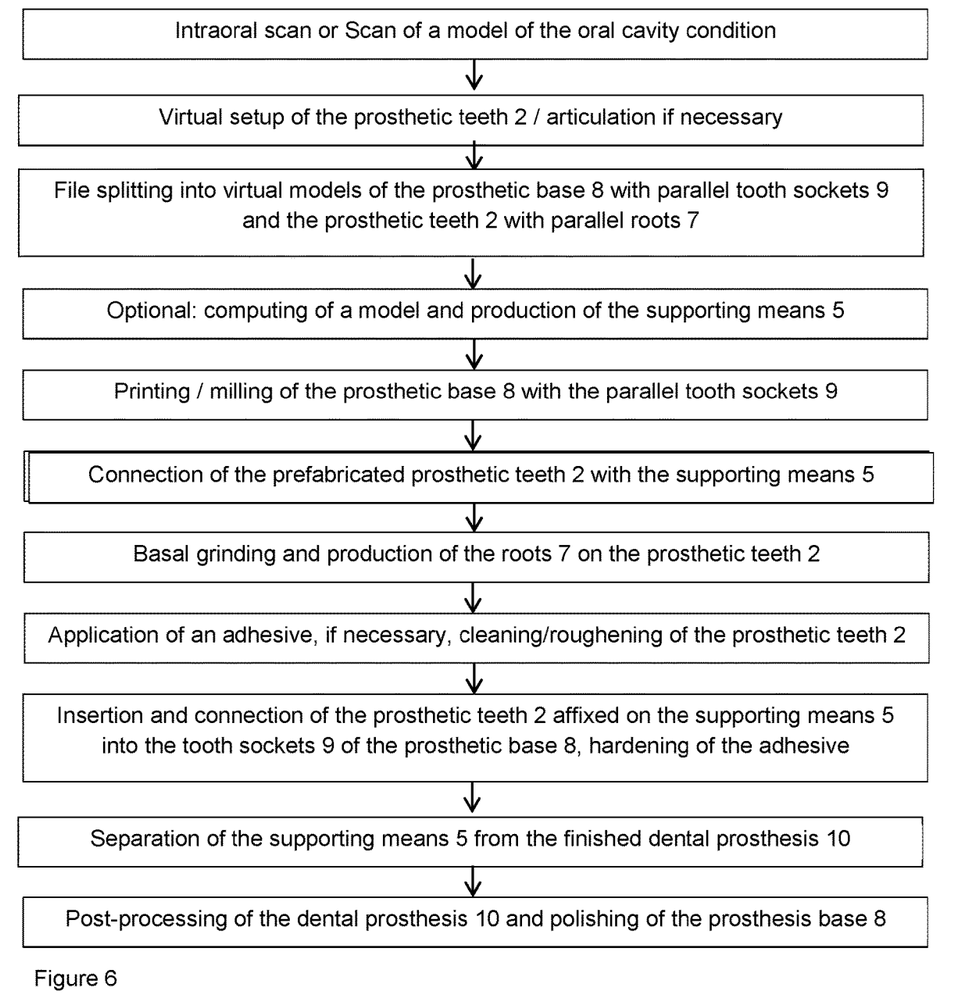
FIG. 6: shows an exemplary procedural diagram for a method according to the invention.

FIG. 6 shows an exemplary procedural diagram for a method according to the invention.

As an option, the real prosthetic teeth 2 can be created using a CAM method.

According to the invention, the objects that form the basis of the present invention are therefore attained, for example, due to the fact that on the basis of an intraoral scan or the scan of an imprint (such as of a plaster model) of the toothless or partially toothless jaw, at first, a virtual dental prosthesis is digitally constructed and then separated using file splitting into a part for the prosthetic base 8 and a part of the prosthetic teeth 2.

In order to position the prosthetic teeth 2, a supporting means 5 is now produced using CAM methods (such as milling or printing) in order to precisely affix the prosthetic teeth 2 in this previously determined spatial arrangement and to be able to transfer them to the prosthetic base 3. Alternatively, the prosthetic teeth 2 are brought into the desired position and orientation in relation to each other and are embedded on the coronal side 3 into a liquid, self-hardening material (such as a wax) and the supporting means 5 are produced when the material hardens.

Prior to the final attachment of the prosthetic teeth 2 in the prosthetic base 8, the prosthetic teeth 2 can also provisionally be attached temporarily in the prosthetic base 8 in order to conduct a trial fitting of the provisional dental prosthesis with the patient. During the trial fitting, a correction of the setup of the prosthetic teeth 2 and the prosthetic base 8 can be made before these are finally attached to each other.

Figure 5:
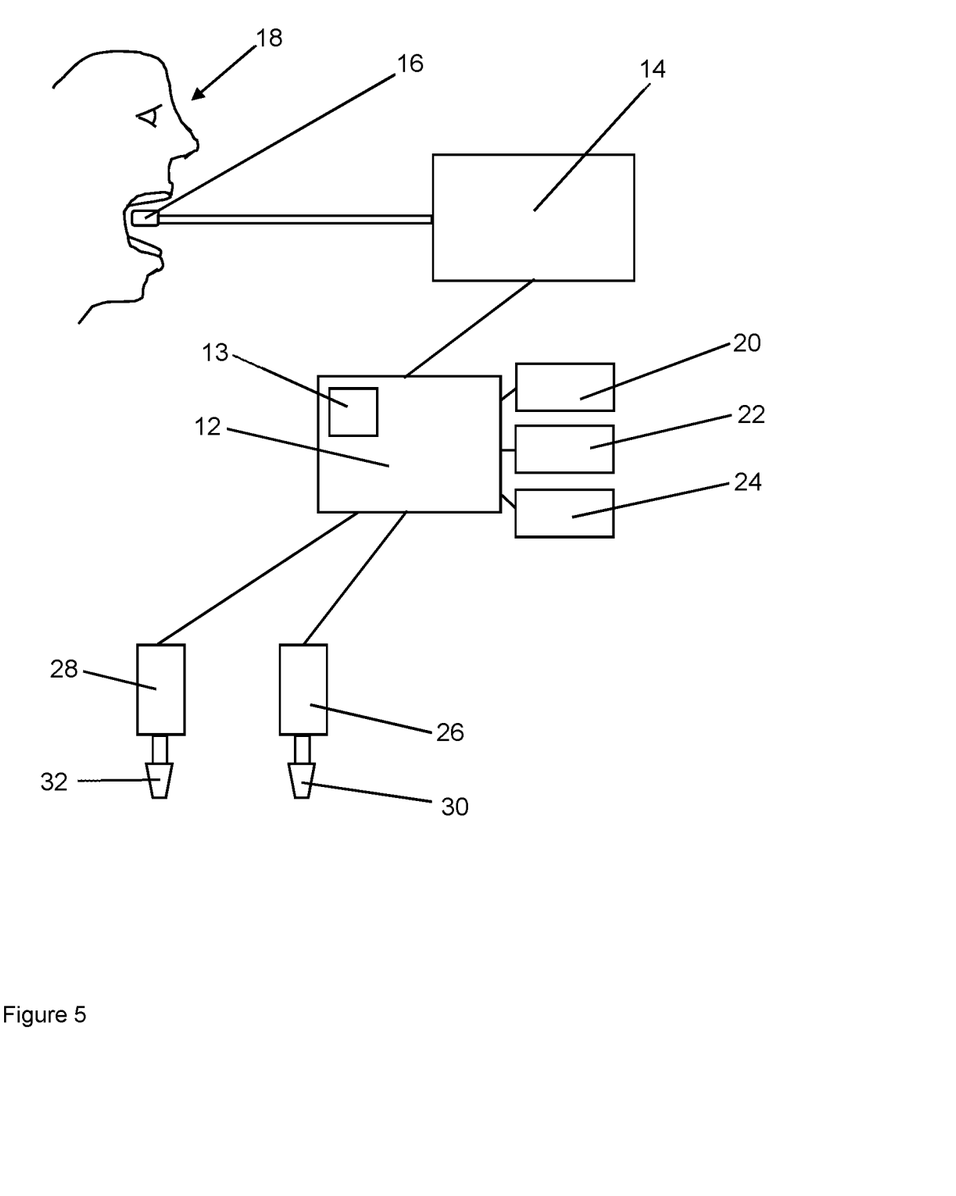
FIG. 5: shows a schematic view of a device according to the invention for implementing a method according to the invention.

FIG. 5 shows a schematic view of a device according to the invention for implementing a method according to the invention. The device can also be understood as a combination of several devices that are connected to each other.

The device comprises a computer 12, which is suitably programmed to implement the key steps of a method according to the invention. The computer 12 has an electronic data storage facility 13, in which the virtual three-dimensional models for implementing the method are stored or are storable and temporarily storable. For example, in the data storage facility 13, the virtual three-dimensional forms of different sets of prefabricated prosthetic teeth 2 can be stored, so that with the program for implementing the method, these data sets can be accessed in order to compute the virtual three-dimensional dental prosthesis model 10 into which the data of these forms of the prosthetic teeth 2 (in particular their coronal and cervical sides) are taken into account.

The computer 12 is connected to an intraoral scanner 14. The intraoral scanner 14 comprises a scanner head 16, which can be inserted into the oral cavity of a patient 18, in order to record the oral cavity condition of the patient 18. The intraoral scanner 14 thus scans the surface of the mucosa and any teeth of the patient 18 that are present. This data is stored in the data storage facility 13 of the computer 12 as a virtual three-dimensional model of the oral cavity condition of the patient 18.

From this model of the oral cavity condition of the patient 18 and the stored virtual three-dimensional forms of the prosthetic teeth 2, a virtual three-dimensional dental prosthesis model is computed with the aid of a dental prosthesis computing module 20.

The device further comprises a root computing module 22 for computing a boundary area between a virtual three-dimensional model of the prosthetic base 8 and at least one virtual three-dimensional model of the prosthetic teeth 2. The virtual three-dimensional model of the prosthetic base 8 and the at least one virtual three-dimensional model of the prosthetic teeth 2 is computed with the aid of a file splitting module 24 for the computational separation of the virtual three-dimensional model dental prosthesis model into the virtual three-dimensional model of the prosthetic base 8 and the at least one virtual three-dimensional model of the prosthetic teeth 2. The interim results are temporarily stored in the data storage facility 13. The root computing module 22 is here programmed such that for each virtual three-dimensional model form of each prosthetic tooth 2 of the at least one model of the prosthetic teeth 2, a basal root 7 is computed as a part of the boundary area, wherein the basal roots 7 lie parallel or aligned to each other in the virtual dental prosthesis model. Accordingly, tooth sockets 9 with a parallel location are included in the virtual three-dimensional model of the prosthetic base 8, since these are after all the negative forms of the roots 7.

For the basal and cervical processing of the prosthetic teeth 2, in other words, for the forming of the roots 7 on the physical prosthetic teeth 2, a first CAM-controlled 4-axis milling machine 26 with a milling head 30 is controlled by the computer 12. With the first CAM-controlled 4-axis milling machine 26, the unprocessed prosthetic teeth 2 (see FIG. 1 above and FIG. 3) are basally processed and cervically processed on the basal side, and during this procedure, the roots 7 are further developed according to the at least one virtual three-dimensional model of the prosthetic teeth 2 (see FIG. 1, lowest drawing, and FIG. 4).

In order to process a prosthetic base blank 6 (see FIG. 1, middle drawing), a second CAM-controlled 4-axis milling machine 28 with a milling head 32 can be controlled by the computer 12. Here, the tooth sockets 9 are worked into the prosthetic base blank 6 according to the virtual three-dimensional model of the prosthetic base 8, so that the prosthetic base 8 is created from this (see FIG. 1, lowest drawing, and FIG. 4). Alternatively, the first CAM-controlled 4-axis milling machine 26 can also be used to produce the prosthetic base 8. According to a further alternative, the prosthetic base 8 can also be generatively produced using a 3D printer (not shown), which is controlled by the computer 12, directly according to the virtual three-dimensional model of the prosthetic base 8.

As supporting means 5 (see FIG. 2, middle and lower drawing), the prosthetic teeth 2 can be poured in wax in the corresponding location and position in the dental prosthesis model. Alternatively, the supporting means 5 can be computed with the aid of the computer 12 from the virtual three-dimensional model dental prosthesis model, in particular from the coronal surfaces of the prosthetic teeth 2 in the dental prosthesis model, and can be produced from a plastic block with the first CAM-controlled 4-axis milling machine 26 or the second CAM-controlled 4-axis milling machine 28. During insertion into the supporting means 5, the coronal sides 3 of the prosthetic teeth 2 are then automatically brought into the location and orientation in relation to each other that has been assigned to them in the three-dimensional dental prosthesis model.

The features of the invention disclosed in the above description and in the claims, figures and exemplary embodiments can be essentially both individually and in any combination required for the realization of the invention in its different embodiments.

LIST OF REFERENCE NUMERALS

2 Prosthetic tooth
3 Coronal side
4 Basal side
5 Supporting means
6 Prosthetic base blank
7 Root
8 Prosthetic base
9 Tooth socket
10 Dental prosthesis
12 Computer
13 Electronic data storage facility
14 Intraoral scanner
16 Scanner head
18 Patient
20 Dental prosthesis computing module
22 Root computing module
24 File splitting module
26 CAM-controlled 4-axis milling machine
28 CAM-controlled 4-axis milling machine
30 Milling head
32 Milling head
A Axis of the coronal side of the prosthetic tooth
B Axis of the root of the prosthetic tooth
C Axis of the tooth socket

The invention claimed is:

1. A method for producing a dental prosthesis having a prosthetic base and several prosthetic teeth, the method comprising the following steps:
   A) providing a virtual three-dimensional dental prosthesis model of the physical dental prosthesis to be produced, the virtual three-dimensional model of the dental prosthesis being divided into at least one virtual three-dimensional model of the prosthetic teeth and one virtual three-dimensional model of the prosthetic base, or comprises at least one virtual three-dimensional model of the prosthetic teeth and one virtual three-dimensional model of the prosthetic base;
   B) computing a boundary area between the virtual model of the prosthetic teeth and the virtual model of the prosthetic base such that the prosthetic teeth in the virtual model have roots that are aligned parallel to each other and the prosthetic base in the virtual model has tooth sockets that are aligned parallel to each other, the tooth sockets forming a negative shape of the roots of the prosthetic teeth;
   C) affixing several prefabricated prosthetic teeth for the production of the dental prosthesis in a supporting means or providing several prefabricated prosthetic teeth for the production of the dental prosthesis being affixed in a supporting means;
   D) producing the prosthetic base according to the virtual model of the prosthetic base with a CAM method to create tooth sockets that lie parallel to each other;
   E) processing the prosthetic teeth basally and adjacent cervically while holding the prosthetic teeth in the supporting means according to the virtual model of the prosthetic teeth using a CAM method to produce roots of the prosthetic teeth lying parallel to each other when the prosthetic teeth are inserted into the prosthetic base; and,
   F) inserting the processed prosthetic teeth into the tooth sockets of the prosthetic base and attaching the processed prosthetic teeth in the tooth sockets.

2. The method according to claim 1, comprising, in step C), affixing the prefabricated prosthetic teeth to each other in a supporting means in a position and location in which the coronal sides of the prosthetic teeth correspond to a location and an alignment of the prosthetic teeth in relation to each other in the virtual dental prosthesis model.

3. The method according to claim 1, comprising, in step E), attaching the prefabricated prosthetic teeth for processing in the supporting means in a CAM device.

4. The method according to claim 3, comprising, in step E), attaching the prefabricated prosthetic teeth for processing in the supporting means in a computer-controlled mill of a CAM device.

5. The method according to claim 1, comprising, in step F), inserting the prosthetic teeth affixed and processed in the supporting means into the prosthetic base and in step F) or at a time after step F), removing the supporting means after the processed prosthetic teeth have been inserted into the prosthetic base.

6. The method according to claim 1, comprising computationally separating the virtual three-dimensional dental prosthesis model by file-splitting into the at least one virtual three-dimensional model of the prosthetic teeth and the virtual three-dimensional model of the prosthetic base.

7. The method according to claim 1, comprising, when computing the boundary area between the at least one virtual model of the prosthetic teeth and the virtual model of the prosthetic base, disposing surfaces of the computed roots of the virtual models of the prosthetic teeth the virtual surface of the unprocessed prefabricated prosthetic teeth or disposing the entire boundary area within a virtual surface of the unprocessed prefabricated prosthetic teeth.

8. The method according to claim 1, comprising computing a virtual model of the supporting means from an external form of occlusal surfaces of the prosthetic teeth or from an external form of cervical surfaces of coronal sides of the prosthetic teeth and occlusal surfaces of the prosthetic teeth of the virtual three-dimensional dental prosthesis model to form an area of the virtual surface of the virtual supporting means by a negative of the occlusal surfaces or a negative of the occlusal and cervical surfaces of the prosthetic teeth, such that a location and orientation of the prosthetic teeth relative to each other remain the same in the negative, to produce the physical supporting means with a CAM method on the basis of the data of the virtual model of the supporting means and to place the physical prosthetic teeth on and attached to the supporting means, and to place the occlusal surfaces or the occlusal and cervical surfaces of the prosthetic teeth onto the surface of the supporting means that is formed as a matching negative.

9. The method according to claim 1, comprising producing the virtual three-dimensional dental prosthesis model on the basis of an intraoral scan or of a scan of an imprint of the oral cavity condition of the patient to shape the virtual prosthetic base and by virtually positioning virtual models of the prefabricated prosthetic teeth in the virtual prosthetic base.

10. The method according to claim 9, comprising selecting the form, location and/or orientation of the prosthetic teeth by a simulating a location of the dental prosthesis in an oral cavity of the patient and/or by a simulating a location and orientation of the prosthetic teeth in relation to each other and/or in relation to the prosthetic base.

11. The method according to claim 10, comprising simulating an occlusion plane and/or chewing movements of a jaw of a patient.

12. The method according to claim 1, comprising, in step E), basally ablating the prosthetic teeth and cervically ablating the prosthetic teeth on the basal side based on the virtual model of the prosthetic teeth using a CAM method.

13. The method according to claim 12, comprising, in step E), basally ablating the prosthetic teeth and cervically ablating the prosthetic teeth by milling with a computer-controlled milling machine.

14. The method according claim 1, comprising computing the virtual dental prosthesis model based on available data on the external form of known prefabricated prosthetic teeth.

15. The method according to claim 1, comprising processing the prosthetic teeth in step E) to produce the roots to have a symmetry axis that at least partially corresponds to an insertion direction into the tooth sockets of the prosthetic base.

16. The method according to claim 11, comprising producing at least one of the processed prosthetic teeth having a symmetry axis of the roots inclined against an axis of coronal sides of the prosthetic teeth.

17. The method according to claim 12, comprising for at least one of the processed prosthetic teeth, inclining the symmetry axis of the roots against an axis of the coronal sides of the prosthetic teeth by at least 0.5°.

18. The method according to claim 17, comprising for at least one of the processed prosthetic teeth, inclining the symmetry axis of the roots is against the axis of the coronal sides of the prosthetic teeth by at least 2°.

19. The method according to claim 1, wherein the supporting means is a silicone key, a matrix, a wax, or an occlusion plate.

20. The method according to claim 1, comprising, in a single work step, connecting the prosthetic teeth simultaneously and together with the prosthetic base.

21. A dental prosthesis wherein several prosthetic teeth or all prosthetic teeth of the dental prosthesis have roots that are aligned parallel to each other, which are attached in matching tooth sockets, and which are aligned parallel to each other, on the prosthetic base, the dental prosthesis being produced by a method comprising the following steps:

A) providing a virtual three-dimensional dental prosthesis model of the physical dental prosthesis to be produced, the virtual three-dimensional model of the dental prosthesis being divided into at least one virtual three-dimensional model of the prosthetic teeth and one virtual three-dimensional model of the prosthetic base, or comprises at least one virtual three-dimensional model of the prosthetic teeth and one virtual three-dimensional model of the prosthetic base;

B) computing a boundary area between the virtual model of the prosthetic teeth and the virtual model of the prosthetic base such that the prosthetic teeth in the virtual model have roots that are aligned parallel to each other and the prosthetic base in the virtual model has tooth sockets that are aligned parallel to each other, the tooth sockets forming a negative shape of the roots of the prosthetic teeth;

C) affixing several prefabricated prosthetic teeth for the production of the dental prosthesis in a supporting means or providing several prefabricated prosthetic teeth for the production of the dental prosthesis being affixed in a supporting means;

D) producing the prosthetic base according to the virtual model of the prosthetic base with a CAM method-to create tooth sockets that lie parallel to each other;

E) processing the prosthetic teeth basally and adjacent cervically while holding the prosthetic teeth in the supporting means according to the virtual model of the prosthetic teeth using a CAM method to produce roots of the prosthetic teeth lying parallel to each other when the prosthetic teeth are inserted into the prosthetic base; and, F) inserting the processed prosthetic teeth into the tooth sockets of the prosthetic base and attaching the processed prosthetic teeth in the tooth sockets.

22. The dental prosthesis according to claim 21, the prefabricated prosthetic teeth being connected to the prosthetic base on the occlusion area are not or are only marginally post-processed.

23. The dental prosthesis according to claim 22, wherein the prefabricated prosthetic teeth connected to the prosthetic base on the occlusion area on the entire coronal side are not or are only marginally post-processed.

24. A dental prosthesis according to claim 21, comprising several prosthetic teeth or all prosthetic teeth of the dental prosthesis being glued in matching tooth sockets on the prosthetic base.

* * * * *